(12) United States Patent
Coleman

(10) Patent No.: US 7,315,150 B1
(45) Date of Patent: Jan. 1, 2008

(54) METHOD OF POWER CONVERSION AND APPARATUS WHICH ACHIEVES HIGH POWER FACTOR CORRECTION USING RIPPLE CURRENT MODE CONTROL

(75) Inventor: Edward Paul Coleman, Salt Springs, FL (US)

(73) Assignee: Integrated Circuit Design, Inc., Dallas, TX (US)

( * ) Notice: Subject to any disclaimer, the term of this patent is extended or adjusted under 35 U.S.C. 154(b) by 0 days.

(21) Appl. No.: 11/393,562

(22) Filed: Mar. 30, 2006

(51) Int. Cl.
G05F 1/10 (2006.01)
G05F 1/652 (2006.01)

(52) U.S. Cl. ................ 323/222; 323/282; 363/84; 363/89; 363/95

(58) Field of Classification Search ............ 323/222, 323/282, 284; 363/89, 95, 84
See application file for complete search history.

(56) References Cited

U.S. PATENT DOCUMENTS

| | | | | |
|---|---|---|---|---|
| 5,867,379 A | * | 2/1999 | Maksimovic et al. | 363/89 |
| 6,011,707 A | * | 1/2000 | Mine | 363/89 |
| 6,091,612 A | * | 7/2000 | Blankenship | 363/45 |
| 6,101,108 A | * | 8/2000 | Wittenbreder, Jr. | 363/65 |
| 6,154,090 A | * | 11/2000 | Wissmach et al. | 327/552 |
| 6,728,121 B2 | | 4/2004 | Ben-Yaakov | |
| 6,737,846 B1 | | 5/2004 | Ben-Yaakov | |
| 7,142,438 B2 | * | 11/2006 | Khalili | 363/20 |

\* cited by examiner

*Primary Examiner*—Bao Q. Vu
(74) *Attorney, Agent, or Firm*—Steven A. Shaw; W. James Brady; Frederick J. Telecky, Jr.

(57) ABSTRACT

A ripple current mode power converter comprised of a magnetic energy storage element, and a method of determining magnetic storage element charge duration based on periodic magnetic storage element current samples. In the preferred embodiment a controller processes a magnetic storage element ripple current, and average sampled current, to achieve high power factor forgoing the need to sense the AC signal current and voltage levels. The controller element periodically calculates the magnetic storage element charge duration to control the state of the switch element to maintain the AC input current proportional to the AC input voltage.

23 Claims, 17 Drawing Sheets

METHOD OF POWER CONVERSION AND APPARATUS WHICH ACHIEVES HIGH POWER FACTOR CORRECTION USING RIPPLE CURRENT MODE CONTROL

FIELD OF THE INVENTION

The present invention relates to power factor correction, including power factor corrected switch based power converters.

BACKGROUND OF THE INVENTION

This invention relates generally to the field of power conversion, and more specifically to a method of power conversion and apparatus which achieves high power factor correction using ripple current mode control.

Electronic equipment and specifically electronic products that rectify and filter the AC line pollute the AC power line with unwanted line current harmonics. These harmonics do not contribute to the transfer of power from the power source to various loads in a power system, which wastes energy in transfer losses due to wire resistance. Unwanted line current harmonics also reduce the useful life of induction motors and transformers, and lead to higher current ratings for protection devices such as fuses or circuit breakers. These higher current ratings lead to costly, larger gauge system wiring.

The unwanted line current harmonics are harmonics that are not present in the AC line voltage. It has been a goal of the power industry to improve the harmonic content of AC line currents and various standards have evolved and continue to evolve to limit the amount of undesirable AC line current harmonics. That is harmonics that are outside of the fundamental harmonic of the AC line voltage.

An ideal load would appear to the AC line as a resistive load. A resistive load results in line currents that match the spectral content and displacement of the AC line voltage. In other words the resistive load results in current waveforms that are identical to the ac line voltage waveform when scaled by a constant equal to 1/R where R is the resistance of the load, and where R is constant or slowly varying with respect to the AC line voltage.

Power factor is a figure of merit for power conversion systems, and is the ratio of the average load power to the maximum possible power that could be delivered to the load for a given Volt-Amp level. The maximum possible power is the product of the RMS value of the AC line voltage and the RMS value of the AC line current. This maximum occurs when the AC load characteristic is purely resistive, resulting in an ideal power factor of one. Passive and active power factor correction methods and devices have been developed to address the need to reduce unwanted line current harmonics.

Passive power factor correction is an approach that uses passive reactive components to counter the effects of reactive components in the load. For example, an inductive motor load produces line currents that are displaced from the line voltage. By adding a compensation capacitor to the load the displacement can be nullified, producing a load that appears resistive to the AC line. However, this approach required large and expensive components, especially for higher power systems.

Active power factor correction typically employs a switch mode power converter such as a boost converter to emulate a resistive load characteristic. In this approach a power inductor is switched between circuit ground and a load filter capacitor in such a way as to present an average AC line current that is proportional to the AC line voltage. The switching rate is many times faster than the frequency of the AC line voltage so that the AC line voltage can be approximated as a constant voltage source over the period of one switching cycle.

Active power factor correction is usually operative in discontinuous or continuous current mode. Discontinuous current mode is simpler to implement because the inductor current returns to zero amperes before the start of each switching interval. This characteristic is advantageous for reducing switching losses, but requires higher peak current to achieve a given average current level producing greater stress on components in the system. Furthermore, discontinuous current mode control inject high frequency line current components on the AC line which require expensive electromagnetic interference (EMI) filters to reduce conducted emissions levels.

In continuous current mode operation the current levels in the inductor can more closely match the AC line voltage harmonics. In continuous current mode there is a ripple, or small variation in the inductor current levels about the desired average current level. The continuous current mode ripple current is much smaller that the ripple seen in the discontinuous current mode systems.

The control methods for power factor correction in continuous current mode require two control feedback loops. One to match the AC line current to a reference current derived from the AC line voltage or inferred from the converter off duration and the output filter voltage, and the other feedback loop to set the power throughput levels based on output voltage feedback. A typical continuous current mode approach requires AC line current sensing for the current loop controller.

Present approaches to power factor correction have many shortcomings. This has lead to research and development of alternate approaches to power factor corrected systems as described previously. However, many problems remain that need to be solved.

Continuous current mode operation is preferred to reduce component electrical stresses, radiated emissions, and achieve higher efficiencies but continuous current mode operation requires continuously monitored AC line current. Current is monitored and compared to a reference waveform in a feedback loop which leads to a trade-off between high signal to noise current sense monitors and achieving a low average power current sensing capability. This trade-off has lead to approaches that are either noise prone or waste power.

Power factor corrected systems operative in discontinuous current mode are possible without the need to monitor the AC source current. However, these systems are limited to discontinuous current mode operation which has high peak current levels, causing unwanted EMI and electrical stresses on components in the system.

In many approaches to power factor correction the AC line voltage is monitored to provide a reference for the current waveform envelop by a high impedance sense line in close proximity to high power electromagnetic fields. The result is that noise is coupled into the control system. Control elements must be placed in close proximity to power elements and shielded adding cost to the approach in order to reduce noise coupling.

As a consequence of the limitations of present approaches to power factor correction, the art continues to seek improvement to power factor correction methods. It would be desirable to provide a method of power factor correction that operates in continuous current mode and does not require an AC current sensing element. It would also be desirable to provide a method of power factor correction that operates in continuous current mode and does not require AC line voltage or current monitoring. It would also be desirable to provide a method of power factor correction that operates in continuous current mode and does not require AC line voltage or AC current monitoring, and permits the controller element to be remotely located far from noise generating high power components.

BRIEF SUMMARY OF THE INVENTION

The present invention relates to power conversion employing a novel method of control that will hereafter be referred to as ripple current mode control. Ripple current mode control is a control method of that achieves a high power factor without the need to monitor the input AC source voltage or current. The AC input current in inferred from two charge current samples. This approach has great advantages over conventional approaches to power factor correction because the signal gain for current sensing can be high without wasting power over the entire switching interval. Also, ripple current mode control is operable in continuous current mode. Continuous current mode is desirable because the peak currents levels can be minimized for a given average current, which alleviates unwanted component stresses. Continuous current mode lowers the amplitude of switching frequency harmonics worsened by high inductor ripple current levels that are typical of discontinuous current mode approaches. The ripple current mode control calculations can be implemented in a digital signal processor, micro-controller, custom digital hardware, or by standard analog computational elements, which broadens the applications where ripple current mode control is applicable.

In one aspect, the invention relates to a ripple current mode power converter, which achieves a high power factor correction, and does so efficiently.

In another aspect, the invention relates to a ripple current mode power converter, which achieves a high power factor correction without monitoring the return current path of the AC source.

In another aspect, the invention relates to a ripple current mode power converter, which achieves a high power factor correction without monitoring the AC source voltage.

In another aspect, the invention relates to a ripple current mode power converter, having a high-gain current sample at the peak of the inductor current, and a high-gain current sample at the trough or minimum inductor current level.

In another aspect, the invention relates to a ripple current mode power converter, having high-gain current samples at the peak and trough of the inductor current waveform, and low average sampling power by utilizing a minimized sampling duration to switching period ratio.

In another aspect, the invention relates to a ripple current mode power converter, having an inductor current waveform in continuous current mode that is well matched to the shape of the AC input voltage waveform such that a high power factor is achieved.

In another aspect, the invention relates to a ripple current mode power converter, having a sampled and stored charge duration signal that is used in limiting the cycle to cycle changes in the duty cycle to support stable operation over the full range of duty cycles.

In another aspect, the invention relates to a ripple current mode power converter, having a weighted mean or smoothing function operative on the duty cycle values to further enhance stable operation.

In another aspect, the invention relates to a ripple current mode power converter, having a modular design wherein the control and sampling components can be located remotely from high power noise generating components.

In another aspect, the invention relates to a ripple current mode power converter, having a modular design wherein the converter is operated in continuous conduction mode reducing peak current levels for a given power conversion level and lowering power component stresses.

In another aspect, the invention relates to a ripple current mode power converter, having a demand input control signal wherein the control methodology includes a means to increase or decrease the power conversion level based on the demand signal level.

In another aspect, the invention relates to a ripple current mode power converter, having a demand input control signal wherein the control methodology includes a means to increase or decrease the power conversion levels based on the demand signal level in response to the average output voltage of the converter.

In another aspect, the invention relates to a ripple current mode power converter, having a demand input control signal wherein the control methodology includes a means to increase or decrease the power conversion levels based on the demand signal level in response to the average output current of the converter.

Other aspects, advantages, features, and embodiments of the invention will be more fully apparent from the ensuing disclosure and appended claims.

BRIEF DESCRIPTION OF THE DRAWINGS

The drawings constitute a part of this specification, and include exemplary embodiments to the invention, which may be embodied in various forms. It is to be understood that in some instances various aspects of the invention may be shown expanded or enlarged to facilitate an understanding of the invention.

DETAILED DESCRIPTION OF THE PREFERRED EMBODIMENTS

Definitions

Figure 1:
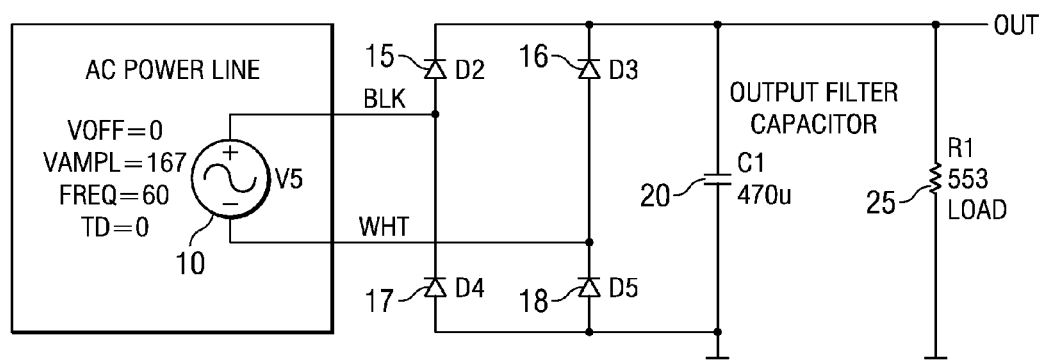
FIG. 1 is a schematic diagram illustrating conventional power conversion with no power factor correction.

Ripple Current Mode Control is a method of power conversion, which achieves a high power factor using an AC voltage source and a demand signal to produce a power source for a load.

The Switching Cycle is the duration between to consecutive charge cycles. The switching cycle is equal to the period of the operating frequency of the converter. Thus, if the operating frequency to the converter is 100 k Hz, the switching cycle if 10 microseconds long The Duty Cycle (D) is the ratio of the charge duration relative to the switching cycle duration.

The Rectified AC source is approximately equal to the absolute value of the AC voltage source.

The Power Factor is the ratio of real power (kilowatts) to apparent power kilovolt-ampere for any given load and time.

Power Factor Correction is a method of increasing the power factor of a system.

The Switching Frequency is the operating frequency of the power converter.

The Switching Period is the duration of time required to complete one switching cycle.

The Charge Cycle, Charge Duration, Switch on time, Energy Charge Duration, or Charge Duration refers to the portion of the switching cycle that is used to charge the magnetic storage element.

The Trough Charge Current is the magnetic element current level corresponding to the start of the charge cycle.

The Peak Charge Current is the magnetic element current level corresponding to the end of the charge cycle.

The Magnetic Storage element is the component of components in a power converter system that store energy in the form of a magnetic field.

The Charge Storage element is the component of components in a power converter system that stores energy in the form of an electrostatic field.

The Stepped Gate Switch Drive is a method of controlling the gate drive signal, or control signal to a switch element such that switch element is partially turned on or set to an intermediate impedance state. The intermediate impedance state is greater than the On state impedance and less that the Off state impedance of the switch. The intermediate impedance is used to control the current to voltage conversion gain of the switch when used as a current sensing element.

The Transfer Duration, Switch off time, Energy Transfer Duration, or Transfer Duration refer to the portion of the switching cycle that is used to transfer the magnetic storage energy to the charge storage element.

The Raw Charge Duration is the calculated value of the charge time duration prior to rate limiting and smoothing.

The Demand Value or Target Value is an input parameter to set the power conversion level of the power converter.

Smoothing as applied to the present invention is a blurring function, or a process of averaging multiple consecutive charge duration calculations using a weighed mean.

A power converter is operating in Discontinuous Current Mode when the magnetic storage element energy is depleted for a portion of each switching cycle. Since the magnetic field is proportional to the magnetic storage element current, the magnetic storage element current is also depleted, or zero for a portion of each switching cycle.

A power converter is operating in Continuous Current Mode when the magnetic storage element energy is either increasing or decreasing for each charge of transfer duration, and the charge and transfer durations sum to equal the switching period. Since the magnetic field is proportional to the magnetic storage element current, the magnetic storage element current is also either increasing or decreasing for each switching cycle.

EMI (electromagnetic interference) is the disruption of operation of an electronic device when it is in the vicinity of an electromagnetic field.

Simulation Results

FIG. 2 and FIGS. 11-18 were generated using Cadence PSPICE version 10.3.0 software (Cadence Design Systems, San Jose, Calif.). PSPICE is a commercially available simulation software package used by design engineers to design and simulate circuits and related systems. PSPICE is a "Simulation Program with Integrated Circuit Emphasis" or SPICE program SPICE was developed by the Electrical Engineering and Computer Sciences Department at the University of California, Berkeley. The diagrams depicted in FIGS. 11-18 are simulation results of PSPICE circuit simulation models. The demonstrate a workable model that serves as a basis for a design implementation. Those skilled in the art can utilized the model diagrams, and simulation results to construct a working design. The models use a combination of discrete component models, Analog Hardware Description Language (AHDL) statements, and Behavior models. The AHDL statements, and Behavior models can be implemented in a variety of ways with simple electronic circuits, This model enables a design engineer to demonstrate a systems approach or method to address a problem or set of requirements without constraining the design to one implementation. Modeling of this nature is a common approach to systems design for complex systems.

PRIOR ART

Referring to FIG. 1 a typical approach to AC-to-DC conversion is illustrated. An AC power source 10 is connected to a bridge rectifier comprised of diodes 15, 16, 17 and 18. The rectified AC source is then filtered by capacitor 20, producing a DC voltage source to drive the load element 25.

Figure 2:
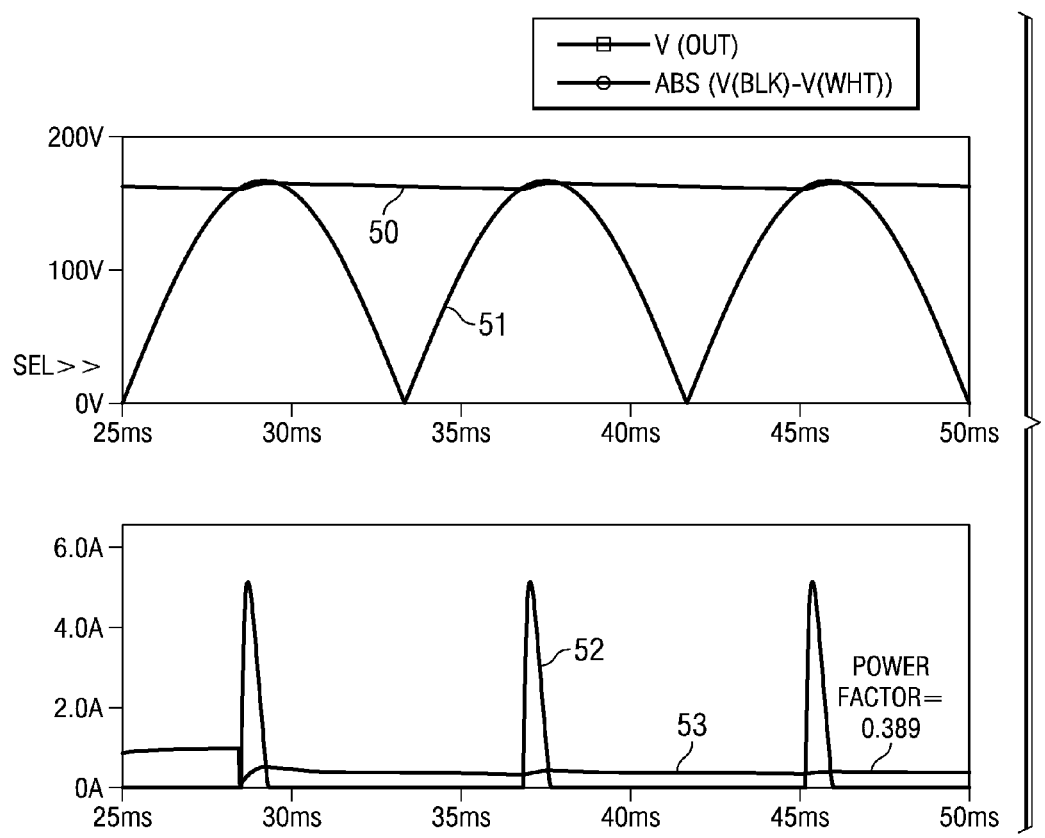
FIG. 2 is a demonstrative plot showing the significant difference in wave shape between the rectified AC source voltage and AC source current.

Waveforms 50, 51, 52, and 53 corresponding to FIG. 1 are shown in FIG. 2. The DC output voltage 50 has primarily a DC component, and secondarily an AC component or ripple voltage. This occurs because for much of the rectified AC waveform 51, the AC source current 52 is zero. When the AC source current is zero, the load current has to be supplied by the filter capacitor 20 of FIG. 1, resulting is a drop in the DC output voltage until the AC source once again exceeds the output voltage. In this conventional approach to AC-DC power conversion, the source current 52 is not proportional to the rectified source voltage 51. The harmonic content of the AC source current waveform differs from the harmonic content of the AC Voltage source. The approach to AC-to-DC power conversion shown in FIG. 1 results in a power factor calculation 53 of 0.389, which indicates a significant level of unwanted AC source current harmonics. These unwanted harmonics distort the AC line voltage due to source impedance, and pollute the AC line voltage. The high peak current pulses 52 cause electrical stresses on the components of the power conversion system.

Figure 3:
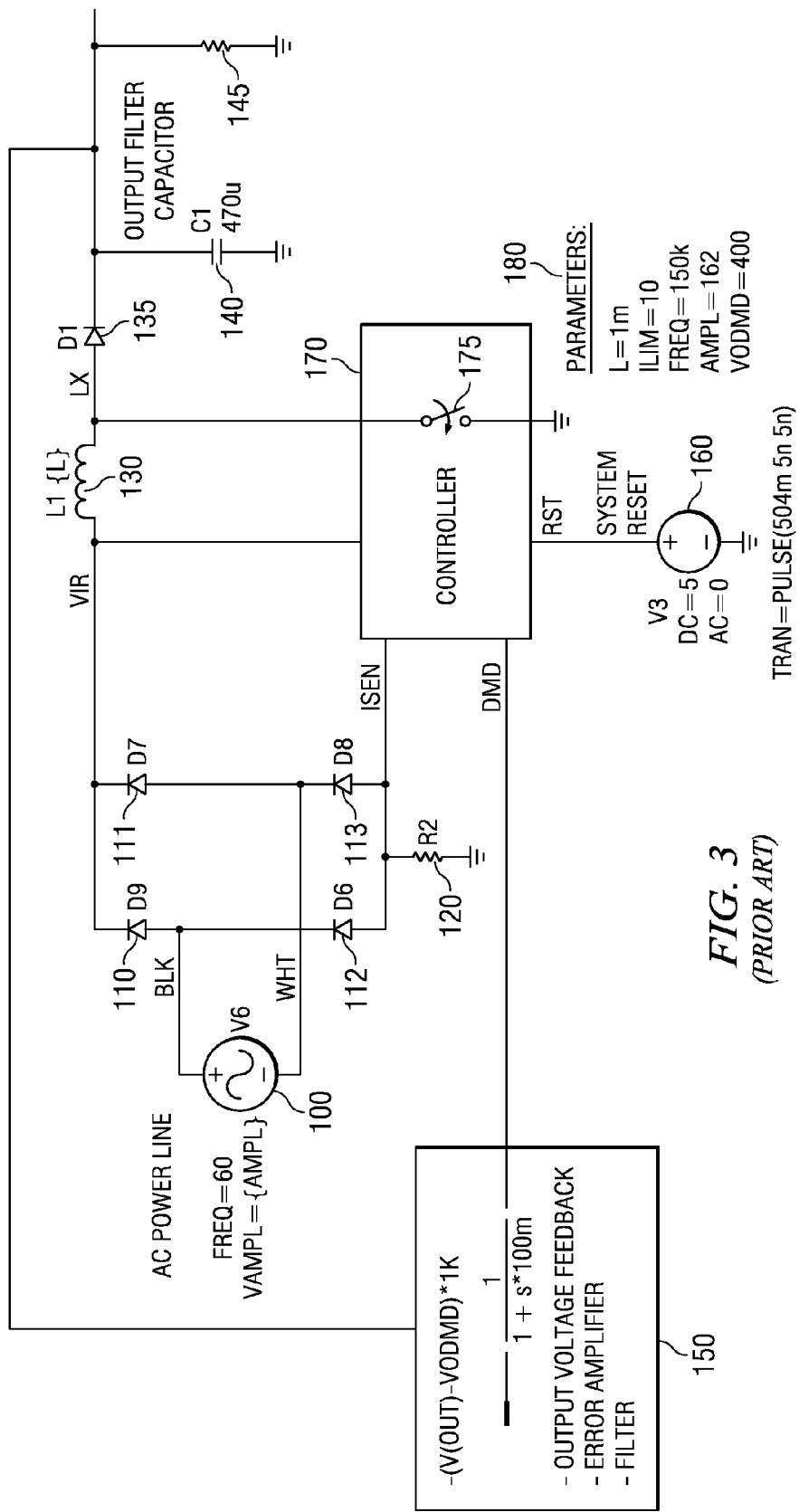
FIG. 3 is a schematic diagram illustrating a conventional power factor converter.

Now referring to FIG. 3 a typical approach to AC-to-DC conversion with power factor correction is illustrated. An AC power source 100 is connected to a bridge rectifier comprised of diodes 110, 111, 112, and 113. The rectified AC source vir is connected to an inductor 130, which is charged through switch 175 in controller 170. Once the inductor is charged to a predetermined level the switch 175 is opened, and inductor current flows through diode 135 to charge the output filter capacitor 140 supplying energy to the load element 145.

The average output voltage or DC component of the filter capacitor 140 is compared to a reference signal vodmd in feedback circuit 150 to set the demand signal dmd. The demand signal dmd together with current sense signal isen and rectified AC source signal vir are used by the controller 170 to determine the switch 175 on time. The controller 170 controls the switch on time such that the rectified AC source current waveform isen developed across sense element 120 is proportional to the rectified AC source voltage waveform vir. Voltage source 160 provides a system reset pulse rst to controller 170 logic, and parameters 180 are a list of global parameters that are used to set the component values for simulation.

The conventional approach is illustrated in FIG. 3 requires an AC source current sense element 120 which wastes power and a means to sense the rectified AC source voltage vir which is susceptible to EMI. The sense signals isen and vir are susceptible to noise coupling from high power components diodes 110, 111, 112, and 113, inductor 130 and filter capacitor 140. To reduce noise coupling the sense wires of traces isen and vir must be kept short which restricts the location of controller 170 in the power conversion system. The result is an implementation that is difficult to configure, and is not suitable of a modular design approach.

Introduction to Ripple Current Mode Control

Ripple current mode control as described herein is intended primarily for AC to DC power converters operable in continuous current mode. Ripple current mode control can be applied to direct AC voltage to DC current power factor corrected conversion with or without current level feedback, or to AC voltage to DC voltage power factor corrected conversion with or without DC voltage feedback.

Ripple current mode control is a method of achieving near unity power factor in continues current mode thereby reducing electrical stress on power processing components. Ripple current mode control may be used to derive a power factor corrected DC current source from an AC voltage source to drive LASER or LED loads. Ripple current mode control may be used to derive a power factor corrected DC voltage source from an AC voltage source to drive electronic systems. Ripple current mode control may be used to derive a power factor corrected DC current source from a multiphase AC voltage source to drive a plethora of loads including LASER and LED loads. One skilled in the art will recognize that ripple current mode control as described herein may be applied to many electronic systems where the input power source is AC, and a high power factor is desired.

Figure 4:
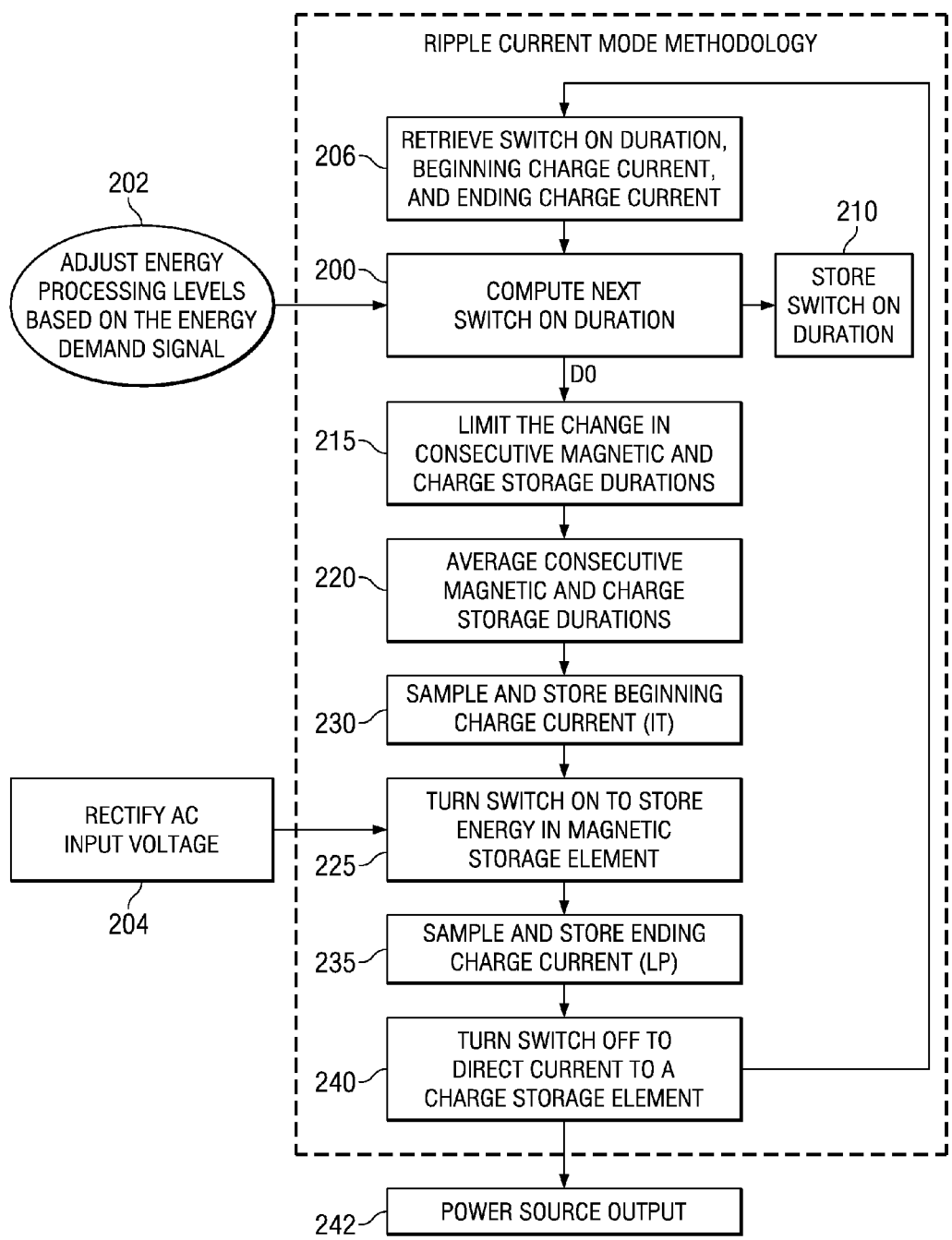
FIG. 4 is a flow chart of the operations that comprise the ripple current mode control method.

One embodiment of the ripple current mode control methodology showing the steps comprising the methodology is depicted in FIG. 4. A rectified AC voltage is generated by rectifying an AC input voltage or source 204, which supplies power to be converter to a DC power source 242 at power conversion levels set by demand signal 202, and periodically calculated magnetic storage element charge durations, such that the AC source current waveform is directly proportional to the input voltage waveform. This is characteristic of a resistive load and results in a near unity power factor. The method is periodic at the switching frequency of the converter which is much greater than the AC line frequency. The AC line current and voltage can be approximated as constants over the period of the switching frequency.

The switch on time, or charge duration which is the duration of time that the magnetic storage element is charged, storing energy in the magnetic storage element, is computed once for each switching cycle of the converter. The charge duration for each cycle is calculated by retrieving the stored on time, beginning magnetic switching element charge current, and ending magnetic switching element charge current 206. Magnetic switching element on time or charge duration is calculated in computations element 200 based on the following formula:

$$D0 = irip/isum * K$$

Where:

$$Irip = ip - it$$

$$Isum = ip + it$$

K is a gain term that is proportional to the input energy demand signal 202

Ip is the ending charge current

It is the beginning charge current

D0 is the raw charge duration for the current switching cycle.

The ending charge current from the prior switching cycle is used is to calculate the next switch on time. Since the switching frequency of the converter is much greater than the frequency of the AC voltage source, the prior cycles charge duration value is sufficiently accurate to achieve extremely high power factor correction.

The raw switch on time is permitted to vary from the last cycles charge duration based on a limiter element 215, and then averaged with the stored switch on time or times in element weighted average or smoothing function 220.

Next, the charge switch is turned on 225 based on the charge duration or charge time result of step 220 controlling the switching member to store energy in the magnetic storage element. Prior to turning on the charge switch, the trough charge current is sampled it and stored 230. Once the sample is completed, the charge switch is turned on.

Once the charge duration ends, the ending charge current ip is sampled and stored 235, and then the charge switch is turned off controlling the switching member to transfer energy to the charge storage element by directing current from the magnetic storage element to the charge storage element 240.

At this point in the method, one complete switching cycle ends, and the steps are repeated for the next switching cycle. Energy is transferred from the charge storage element to the load by means of a connecting element 242.

The flow chart depicted in FIG. 4 is one embodiment of the invention. One skilled in the art can conceive of alternate approaches. For, example: the charge current samples can be done prior to, or after the switching events because magnetic storage elements oppose a charge in current, and either sample sequence will result in adequate charge current samples to calculate the ripple and sum current functions. It is also a logical extension of the lessons learned in this method to apply the method to energy transfer duration, or energy charge duration with respect to energy transfer duration, or the energy charge duration with respect to the switching period of the converter.

This method can also be utilized in variable switching frequency power converters by calculating the energy charge or transfer duration with respect to the energy charge duration plus the energy transfer duration. This list of examples for applications of the ripple current control mode methodology is not complete, but offers some indication of the ways in which ripple current mode control can be utilized.

Figure 5:
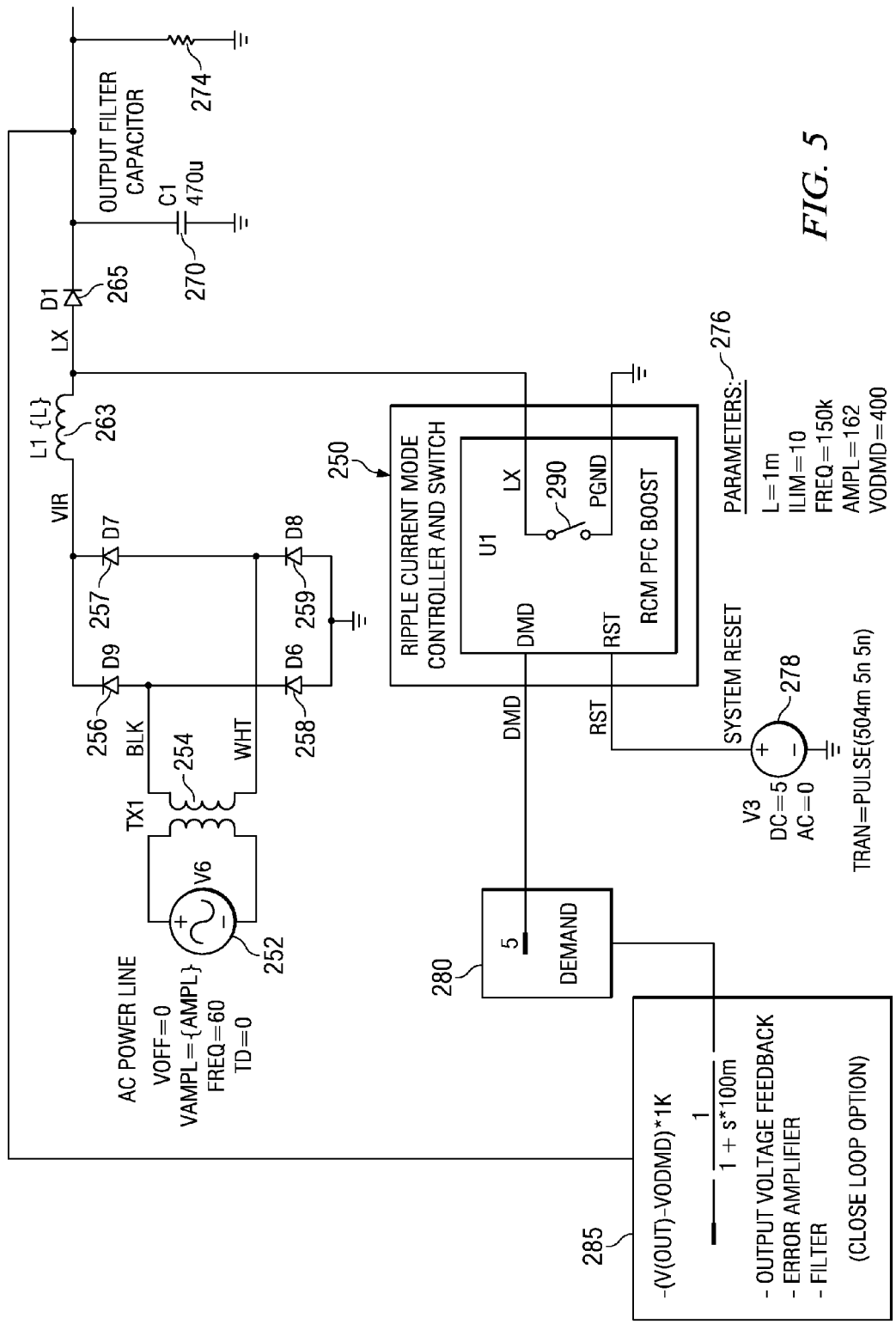
FIG. 5 is a schematic diagram illustrating a isolated boost mode power converter including a controller using ripple current mode control, and an integrated charge switch.

The schematic diagram for a boost power converter for one embodiment is provided in FIG. 5. An AC power source 252 is connected to the primary side of transformer 254. The secondary side of transformer 254 is connected to a bridge rectifier comprised of diodes 256, 257, 258, and 259. The rectified AC source vir is connected to an inductor 263 used to store energy, which is charged through switch 290 in controller 250. Once the inductor is charged to a predetermined level the switch 290 is opened, and inductor current flows through diode 265 to charge the output filter capacitor 270 used to store energy, and supply energy to the load element 274.

The average output voltage or DC component of the filter capacitor 270 is compared to a reference signal vodmd in feedback circuit 285 to set the demand signal dmd, which is used to vary the energy conversion levels of the converter. The demand signal dmd is used by the controller to determine the switch 290 on time to control the amplitude of the AC source current waveform in response to line and load variations. The controller 250 controls the switch on time such that the rectified AC source current waveform is proportional to the rectified AC source voltage waveform vir. Voltage source 278 provides a system reset pulse rst to controller 250 logic, and parameters 276 are a list of global parameters that are used to set the values components for simulation purposes.

The transformer 254 provides isolation between the AC source and the load element, and the turns ratio of transformer 254 can be set to increase or decrease the AC source amplitude to suit the needs of a broad range of high voltage and low voltage applications. Controller 250 can be implemented as a custom high voltage or low voltage IC by setting the turns ratio of transformer 254 to limit the maximum voltages seen by the controller 250.

Figure 6:
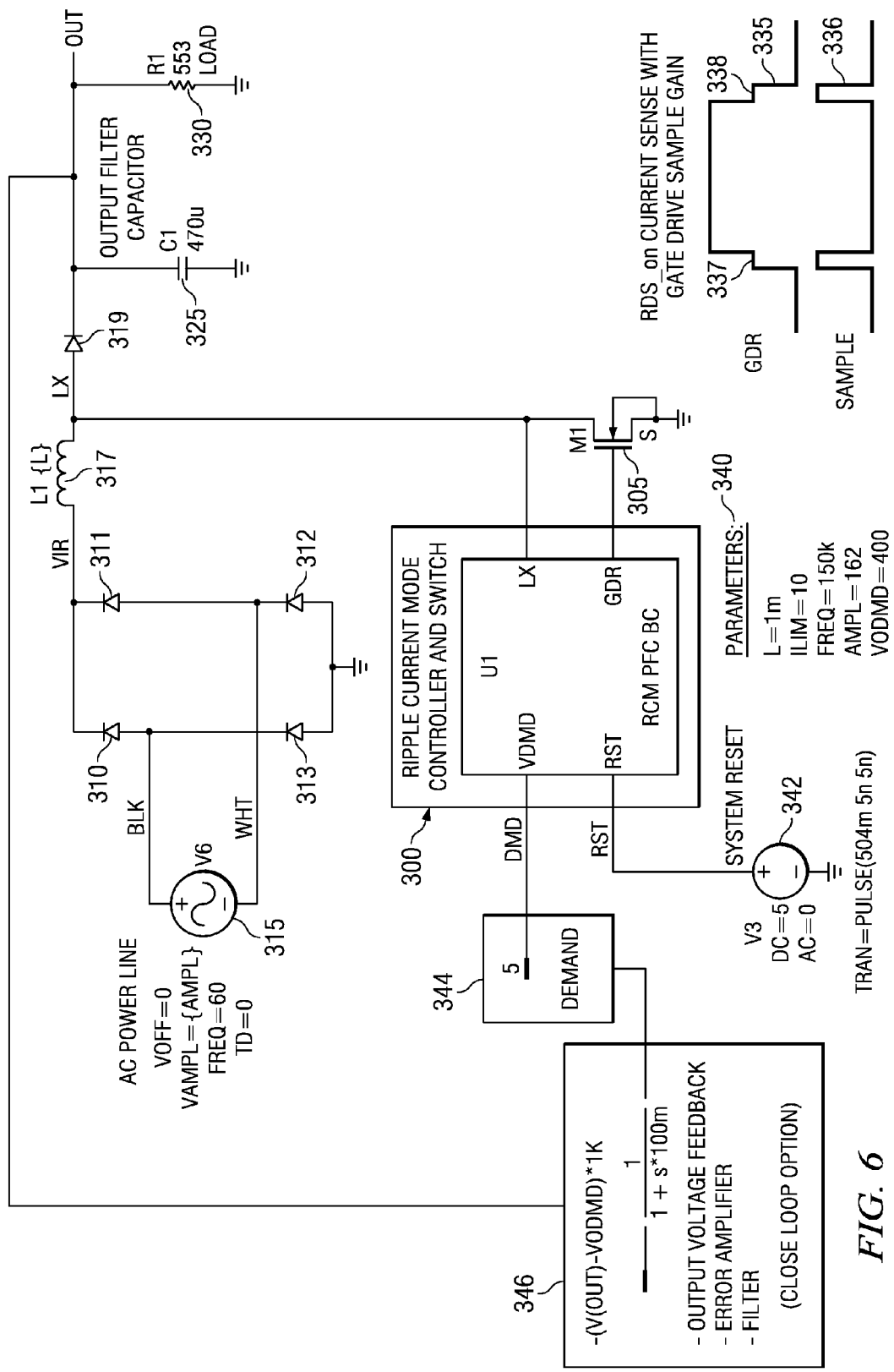
FIG. 6 is a schematic diagram illustrating a boost mode power converter including a controller using ripple current mode control, and an external charge switch and stepped gate current sensing.
Figure 7:
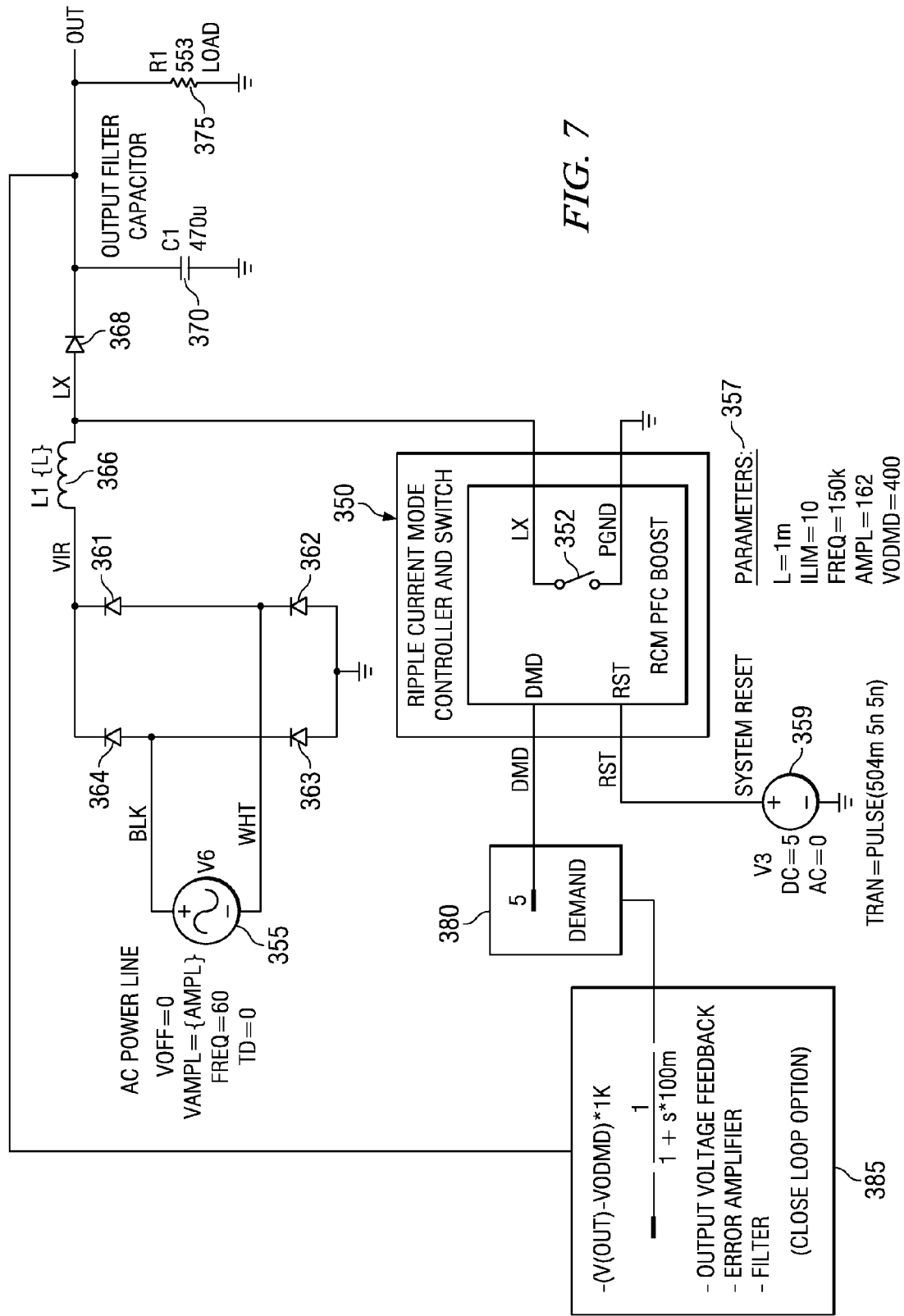
FIG. 7 is a schematic diagram illustrating a non-isolated boost mode power converter including a controller using ripple current mode control, and an integrated high voltage-charge switch.

The schematic diagram for a boost power converter for another embodiment is provided in FIG. 6. An AC power source 315 is connected to a bridge rectifier comprised of diodes 310, 311, 312, and 313. The rectified AC source vir is connected to an inductor 317, which is charged through switch 305 in controller 300. Once the inductor is charged to a predetermined level the switch 305 is opened, and inductor current flows through diode 319 to charge the output filter capacitor 325 supplying energy to the load element 330.

The average output voltage or DC component of the filter capacitor 325 is compared to a reference signal vodmd in feedback circuit 346 to set the demand signal dmd. The demand signal dmd is used by the controller to determine the switch 305 on time to control the amplitude of the AC source current waveform. The controller 300 controls the switch on time such that the rectified AC source current waveform is proportional to the rectified AC source voltage waveform vir. Voltage source 342 provides a system reset pulse rst to controller 300 logic, and parameters 340 are a list of global parameters that are used to set the values components for simulation.

The stepped gate current sensing switch drive signal gdr is derived in controller 300 such that the charge current sample can be sensed by a partially turned on of switch 305. The gate drive signal gdr is illustrated in time-domain waveform 335. During the current sensing interval the gate is partially turn on 337 and 338. In this example gate drive circuit, the switch on resistance is proportional to the gate drive voltage gdr minus a threshold voltage. The rising and falling edges of gate drive signal gdr is paused during the sample period, which occurs when sample waveform 336 is logic high. This approach results in a high resistance switch during current sensing, and a low resistance switch during the remainder of the charge period. This approach to low average power high gain current sampling maintains charge current in the switch element and uses the controller 300 to sample the voltage across the switch at node lx during the partial gate drive period of the gate drive waveform 335.

Boost Mode Power Converter

Figure 11:
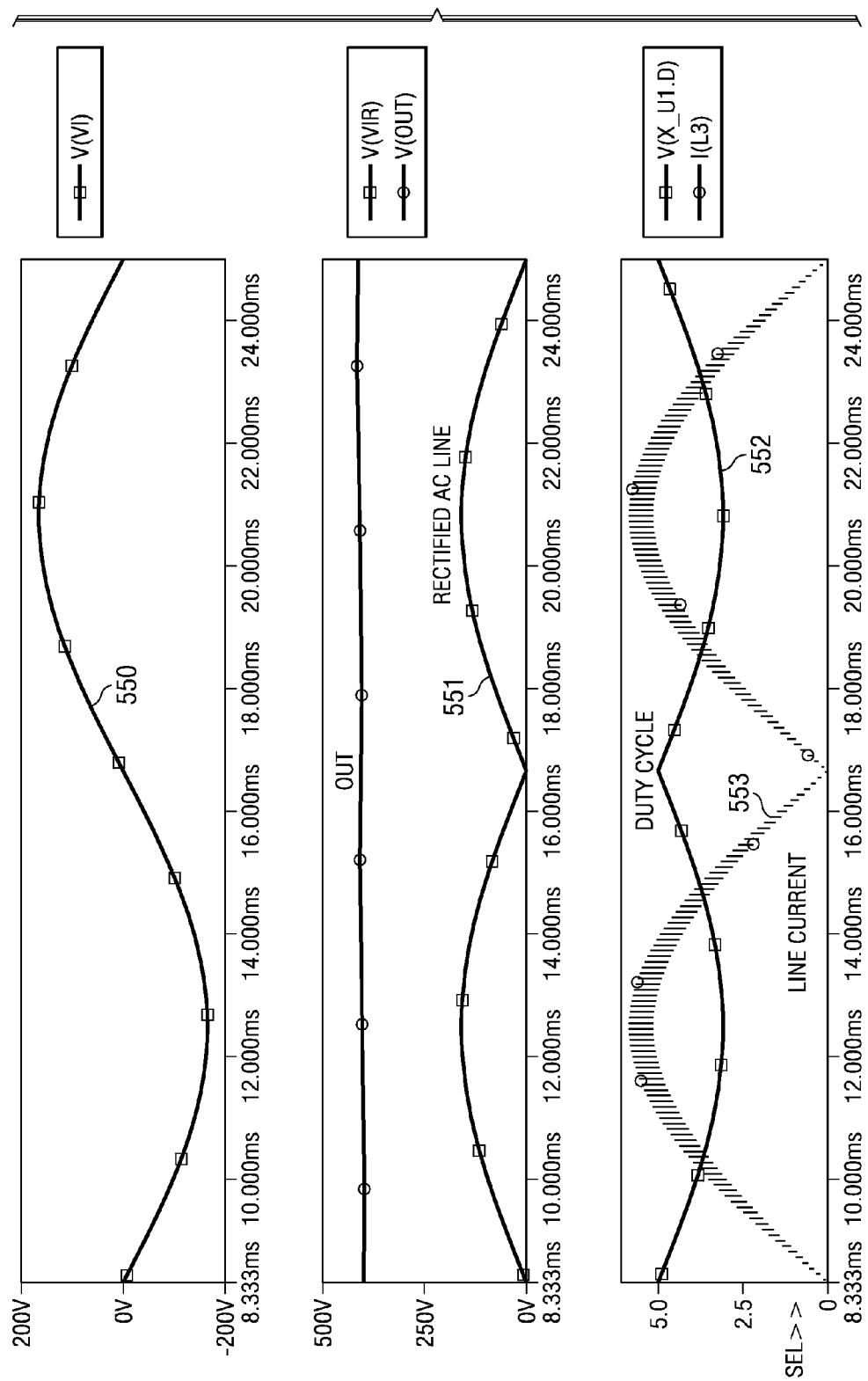
FIG. 11 depicts PSPICE simulation results showing time dependent AC line input, rectified AC line voltage, duty cycle, and inductor current waveforms.
Figure 12:
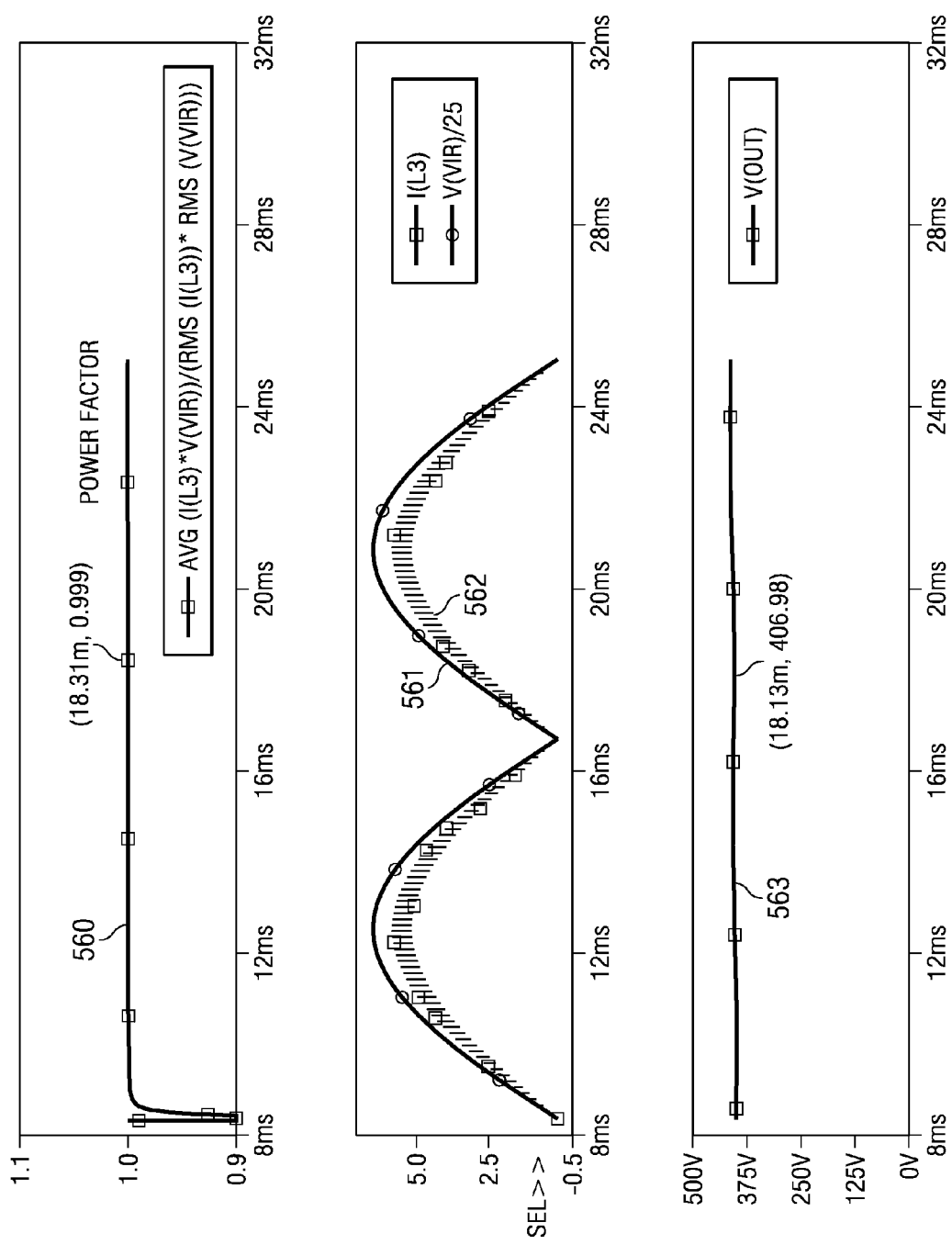
FIG. 12 depicts PSPICE simulation results showing calculated power factor and time dependent rectified AC line voltage, inductor current, and output voltage waveforms.

The schematic diagram for a boost power converter for yet another embodiment is provided in FIG. 7, FIG. 8, FIG. 9 and FIG. 10. The associated simulation waveforms 550, 551, 552, and 553 are shown in FIG. 11, and associated simulation waveforms 560, 561, 562, and 563 are shown in FIG. 12.

An AC power source 355 is connected to a bridge rectifier comprised of diodes 361, 362, 363, and 364. The waveform for the AC power 550 is sinusoidal for this example, but can contain multiple harmonics. The waveform of the rectified AC source vir, 551 is approximately equal to the absolute value of the AC power source. The rectified AC source vir is connected to an inductor 366, which is charged through switch 352 in controller 350. Once the inductor is charged to a predetermined level the switch 352 is opened, and inductor current flows through diode 368 to charge the output filter capacitor 370 supplying energy to the load element 375.

The average output voltage or DC component of the filter capacitor 370 is compared to a reference signal vodmd in feedback circuit 385 to set the demand signal dmd. The demand signal dmd is used by the controller to determine the switch 352 on time to control the amplitude of the AC source current waveform, which adjusts the energy conversion level of the converter. The demand signal dmd is used by the controller to maintain a regulated output current or voltage in the presence of line and load variations for systems that require a regulated output power source. The controller 350 controls the switch on time such that the rectified AC source current waveform 553 is proportional to the rectified AC source voltage waveform vir 551. Voltage source 359 provides a system reset pulse rst to controller 350 logic, and parameters 357 are a list of global parameters that are used to set the values of components for simulation. Waveform 560 is a calculated result for the power factor for the input AC source voltage waveform 561 and current waveform 562. The power factor is 0.999. The input AC source voltage waveform 561 has been scaled by a factor of 1/25 to provide a better comparison between waveforms 561 and 562.

A1. Ripple Current Mode Controller

Figure 8:
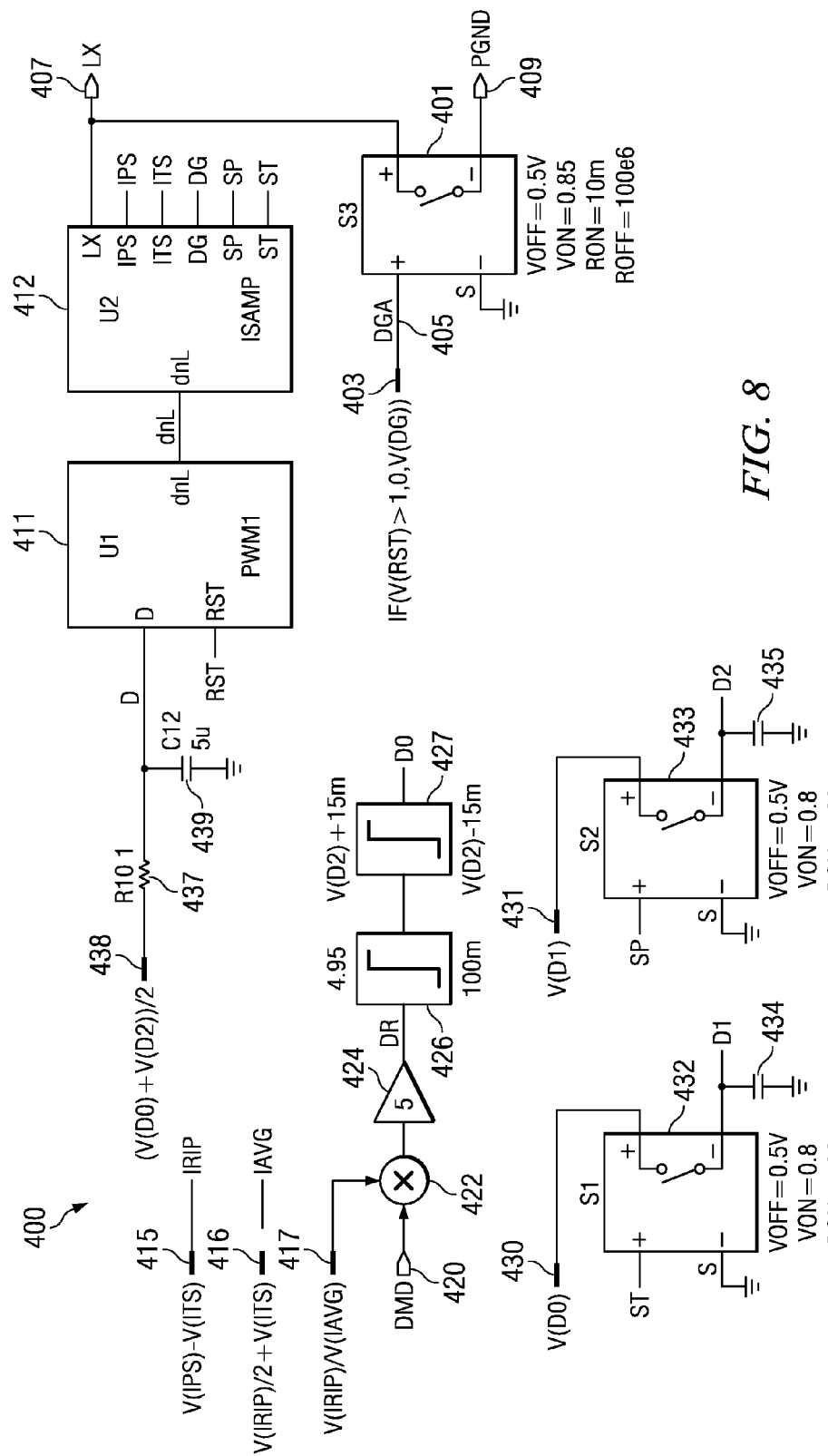
FIG. 8 is a PSPICE Analog Hardware Description Language circuit model for a ripple current mode controller.
Figure 13:
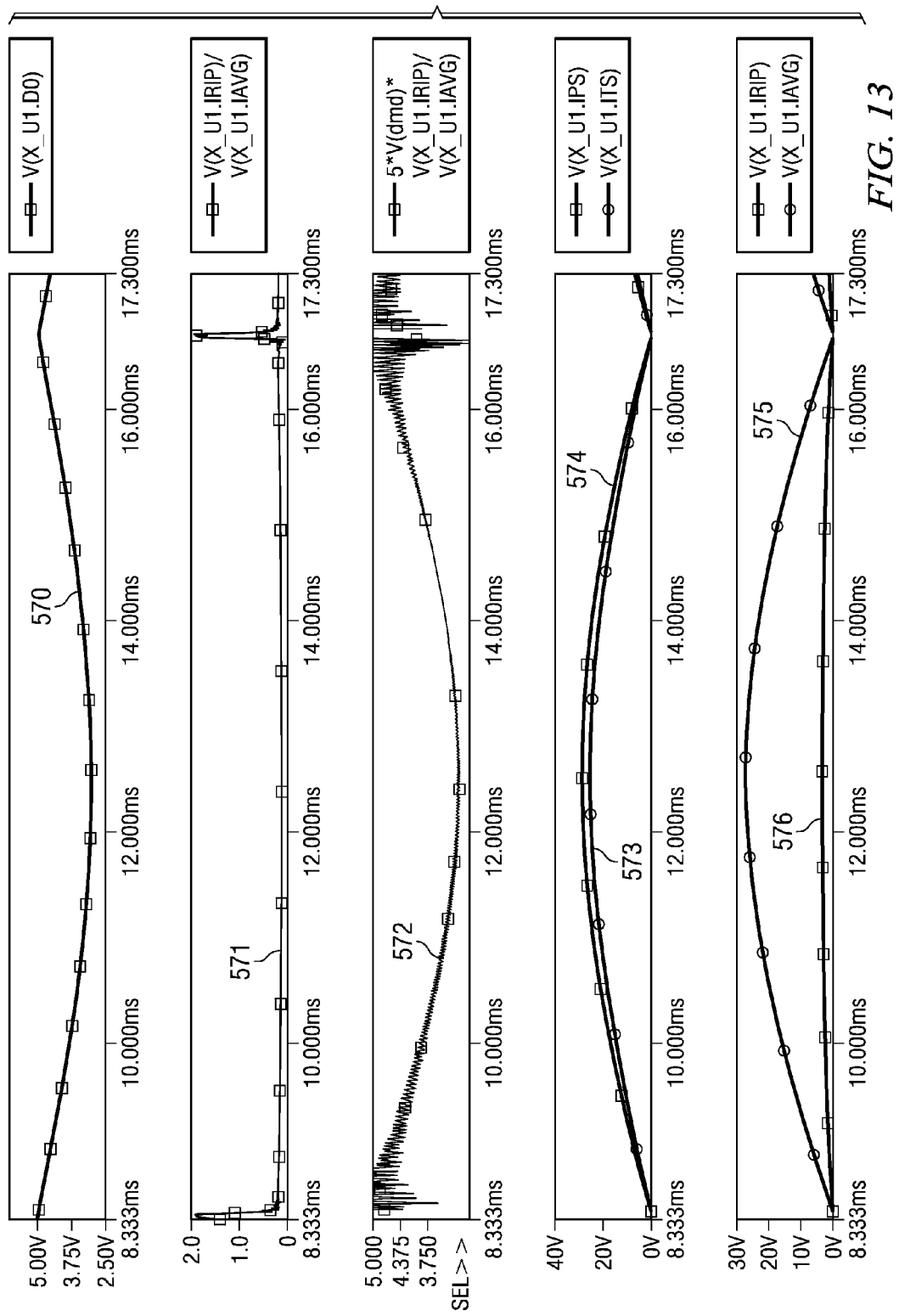
FIG. 13 depicts PSPICE simulation results showing time dependent control terms.
Figure 14:
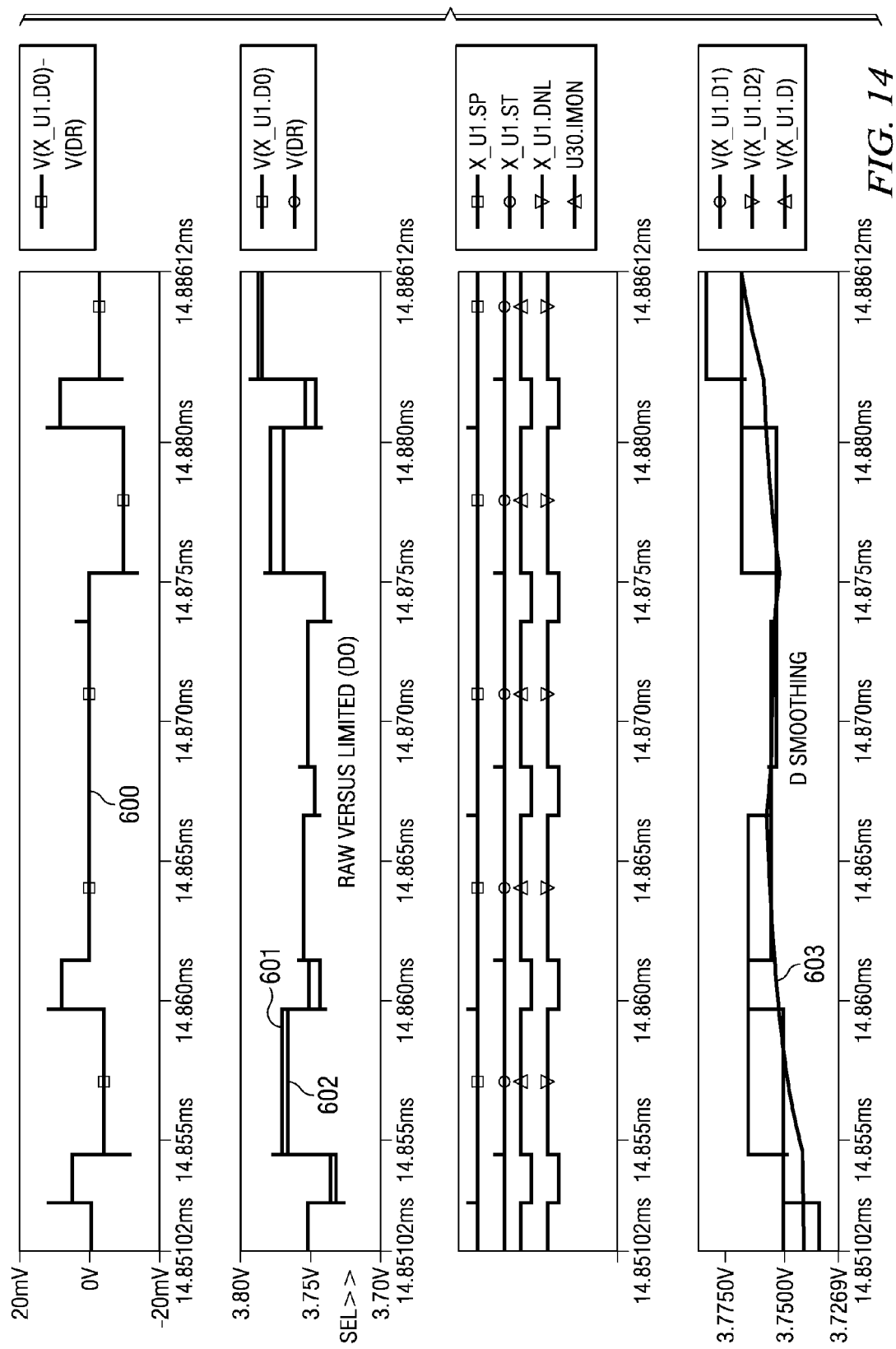
FIG. 14 depicts PSPICE simulation results showing time dependent charge-duration limit and charge-duration smoothing waveforms.

The schematic diagram the ripple current mode controller 350 is provided in FIG. 8. The associated simulation waveforms 570, 571, 572, 573, 574, 575, and 576 are shown in FIG. 13, and associated simulation waveforms 600, 601, 602, and 603 are shown in FIG. 14.

Referring to FIG. 8, the controller schematic 400 is comprised of pin interconnects 407, 409, 420, and 445. The interconnect signal names Lx, pgnd, dmd, and rst correspond to the signal names of the pins for the controller 350 depicted in FIG. 7, and are electrically connected. One embodiment of the controller 350 is depicted in controller sub-circuit schematic 400 of FIG. 8.

The interface pin Lx 407 provides a path for the magnetic charge current through switch 401, and finally to power ground pgnd. The signal Lx is also connected to the Lx pin of the sampling sub-circuit element 412.

The switch element 401 is controlled by expression element 403. When the output of expression element 403 Dga is high or logic 1 the switch element 401 is on or in the low resistive state. The on or low resistive state for switch element 401 is set by parameter RON=10 m which provides a switch resistance of 0.01 Ohms between the Lx node and Pgnd. The off or high resistive state for switch element 401 is set by parameter ROFF=10e6 which provides a switch resistance of 10,000,000 Ohms between the Lx node and Pgnd for the off state. The switch element 401 has an On threshold of VON=0.85 Volts, and an Off threshold of VOFF=0.5 Volts in response to the switch input Dga. Each occurrence of switch elements for the remainder of this disclosure have similar parameters to control switch operation, and switch characteristics.

Expression element 403 sets switch element 401 to the off state whenever reset rst if high. When in normal operation the reset signal rst is low and expression element 403 assumes the state of signal Dg.

The current sampling element 412 has input signals dnL and Lx, and provides a peak magnetic charge current sample ips, a trough or minimum magnetic charge current sample its, a switch drive signal Dg, a peak sample control signal sp, and a trough sample control signal st for each switching cycle.

Pulse width modulator element 411 has the following input signals; duty cycle D and reset rst, and provides output signal dnL to current sampling element 412. Duty cycle signal D is derived from expression element 438, and filtering by a signal pole filter comprised of resistor 437 and capacitor 439. Expression element 438 is a weighted mean or weighted averaging function of the current duty cycle D0 and the retarded duty cycle D2. The weighing terms are one for this embodiment of controller 400.

Expression 415 provides the magnetic charge current ripple irip (waveform 576) which is the difference between the peak magnetic current sample ip (waveform 574) and the trough magnetic charge current it (waveform 573).

Expression 416 provides the average magnetic charge current iavg (waveform 575) which is the average value of the peak magnetic current sample ip and the trough magnetic charge current it.

Expression 417 provides the ratio of the magnetic charge current ripple irip to the average magnetic charge current iavg (waveform 571). This ratio is multiplied by the demand signal dmd by multiplier element 422, which provides a multiplication function. Finally, the result is multiplied by gain element 424 to generate signal Dr (waveform 572). Signal Dr is followed by Limiters 426 and 427 providing signal D0 (waveform 570). The limiter elements 426 and 247 limit the maximum and minimum values of a signal. For example, limiter 426 limits the output of the gain element Dr to a maximum value of 4.95 and a minimum value of 0.100 at the input of limiting element 427. Limiter element 427 limits D0 to the maximum value of D2+0.015, and the minimum value of D2−0.015. The prior magnetic charge duration D2 is retrieved and utilized to limit the variation in contiguous values of the charge durations D0. Limiter 427 performs a rate limit function because is restricts the change of D0 to not more than 0.030 for each consecutive cycle. The waveforms 600, 601, 602, and 603 show the associated limiting and averaging waveforms.

Expression element 430, switch 432, and storage capacitor 434 provide a sample and hold function. When signal st goes high the switch 432 closes, and the value of D0 (waveform 601) is imposed upon the storage capacitor 434. The sampled signal value D1 is held on storage capacitor 434 while st is low until the next sample is taken. The switch element 432 off resistance is large and has minimal effect on the stored value at D1 which is updated one per switching period.

Expression element 431, switch 433, and storage capacitor 435 provide a similar sample and hold function. When signal sp goes high the switch 433 closes and the value of D1 is imposed upon the storage capacitor 435. The sampled signal value D2 is held while sp is low until the next sample is taken. The switch element 433 off resistance is large and has minimal effect on the stored value at D2 which is updated one per switching period.

This cascade of samplers provides a retarded duty cycle value D2 that is used by limiter 427 and expression element 438. The limiting and averaging terms provide stable operation over the duty cycle range of the converter, and provide a smoothing function which acts on the duty cycle D (waveform 603) making the converter less susceptible to noise and sub-harmonic oscillations. By limiting the rate of change of D, the converter is adapted to operate at, and achieve stable operation for duty cycles greater than 50%. By retrieving and utilizing stored prior magnetic charge duration values, and averaging consecutive magnetic charge storage durations noise susceptibility is also reduced.

A1a. Pulse Width Modulator

Figure 9:
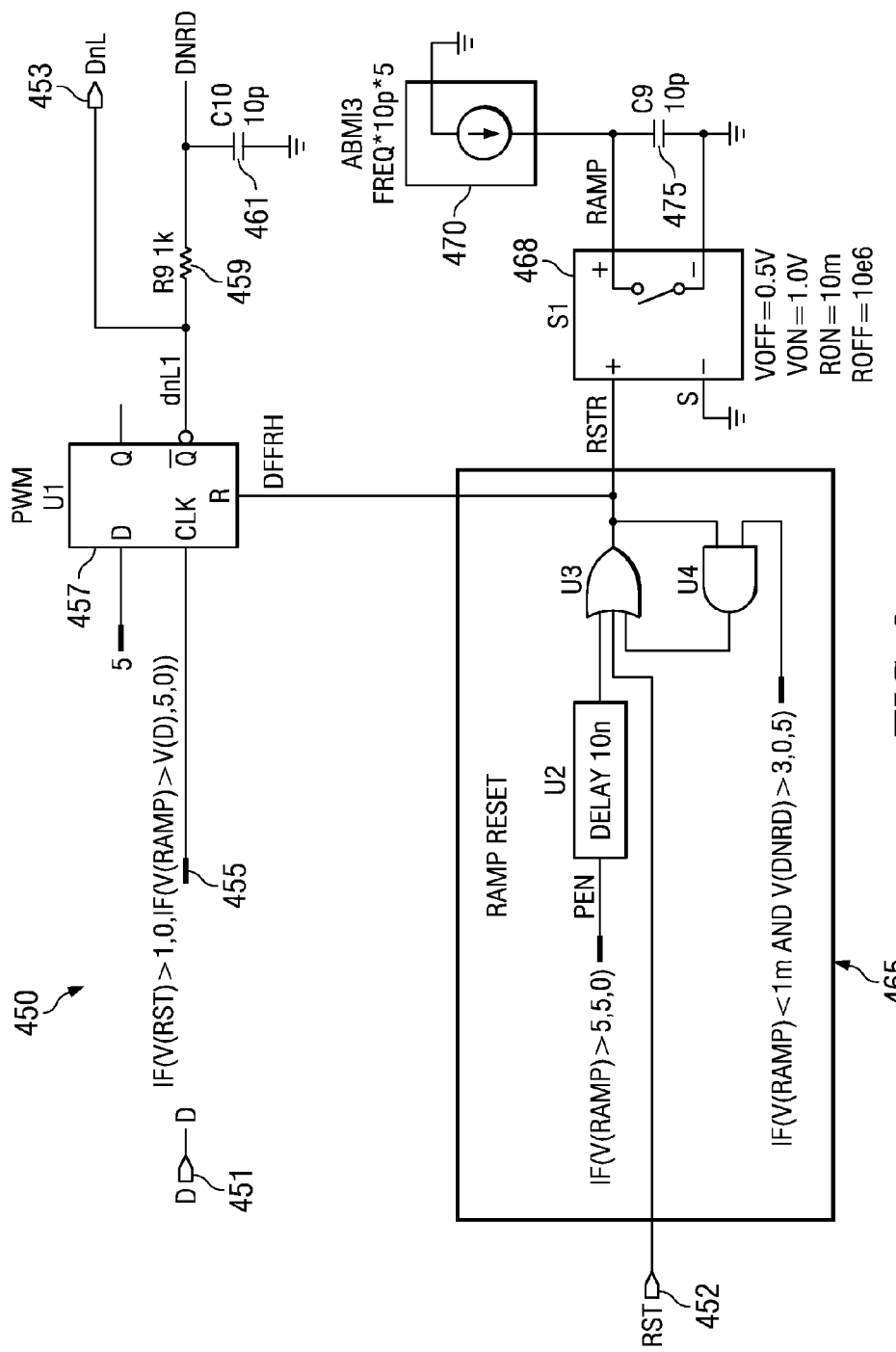
FIG. 9 is a PSPICE Analog Hardware Description Language circuit model for a pulse width modulator used in a ripple current mode controller.
Figure 15:
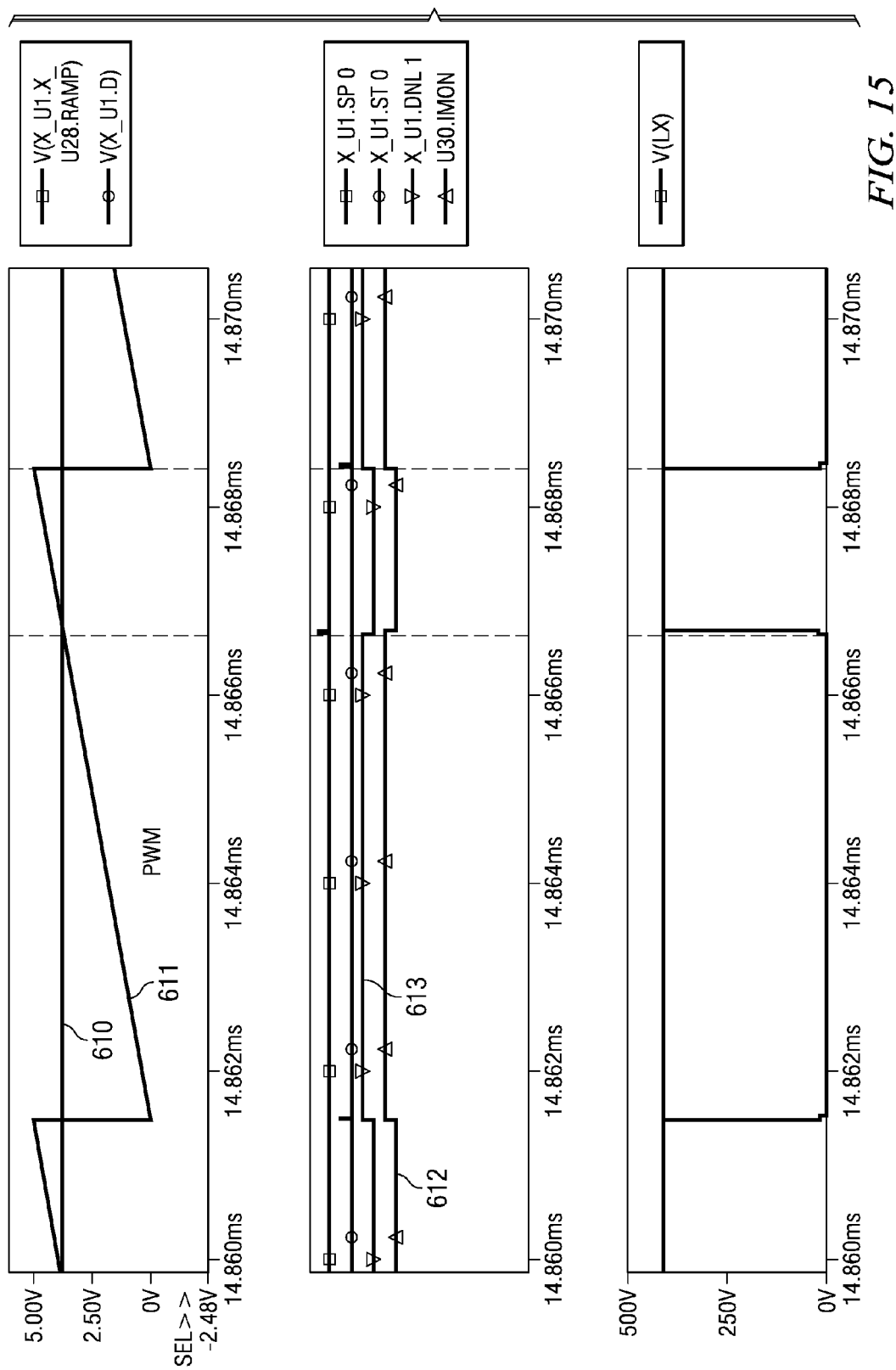
FIG. 15 depicts PSPICE simulation results showing time dependent pulse width modulator waveforms.
Figure 16:
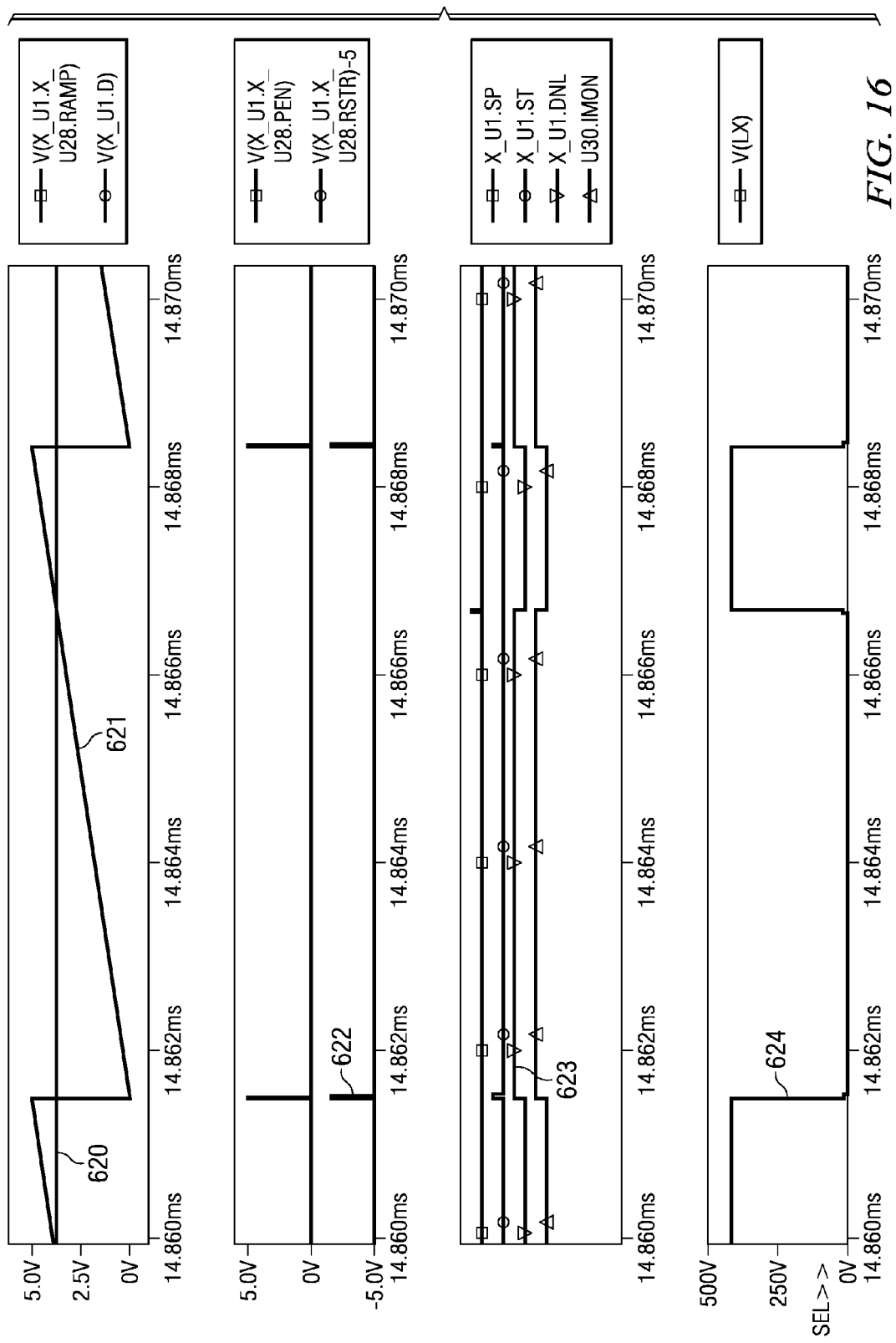
FIG. 16 depicts PSPICE simulation results showing time dependent digital pulse width modulator waveforms, in relation to analog pulse width modulator waveforms.

Referring to FIG. 9, the pulse width modulator schematic 450 is comprised of pin interconnects 451, 452, and 453. The associated simulation waveforms 610, 611, 612, and 613 are shown in FIG. 15, and associated simulation waveforms 620, 621, 622, 623, and 624 are shown in FIG. 16. The interconnect signal names are D, rst, and dnL, and correspond to the signal names of the pins for the element 411 depicted in FIG. 8, and are electrically connected. One embodiment of the pulse width modulator is depicted in pulse width modulator sub-circuit schematic 450 of FIG. 9.

A ramp generator comprised of current source 470, switch 468, and capacitor 475 provides the ramp signal (waveform 611). At the start of each switching cycle the capacitor is discharged to a value of 0.001 through switch 468. Once capacitor 475 is discharged to a value 0.001, the switch 468 is turned off, and the current source provides a constant current into capacitor 475 producing a linear ramp signal ramp. The ramp signal is reset at the beginning of each cycle of the converter.

When the reset signal rst is high the expression element 455 remains in the low state. During normal operation or when the reset signal rst is low the ramp signal is compared to the duty cycle signal D (waveform 6-10) in expression element 455. Referring to the waveforms in FIG. 16, when the ramp signal ramp (waveform 621) exceeds the value of the duty cycle signal D (waveform 620) the expression element 455 provides a logic high to the flip-flop 457 to terminate the charge cycle by setting dnL (waveform 623) to a logic low state.

At the end of each switching cycle the ramp generator is reset in ramp reset element 465, When the ramp signal exceeds a value of 5 the reset ramp signal rstr (waveform 622) goes high turning on switch 468 and resetting flip-flop 457, setting dnL (waveform 623) high to begin the next switching cycle.

A1b. Charge Current Sampler

Figure 10:
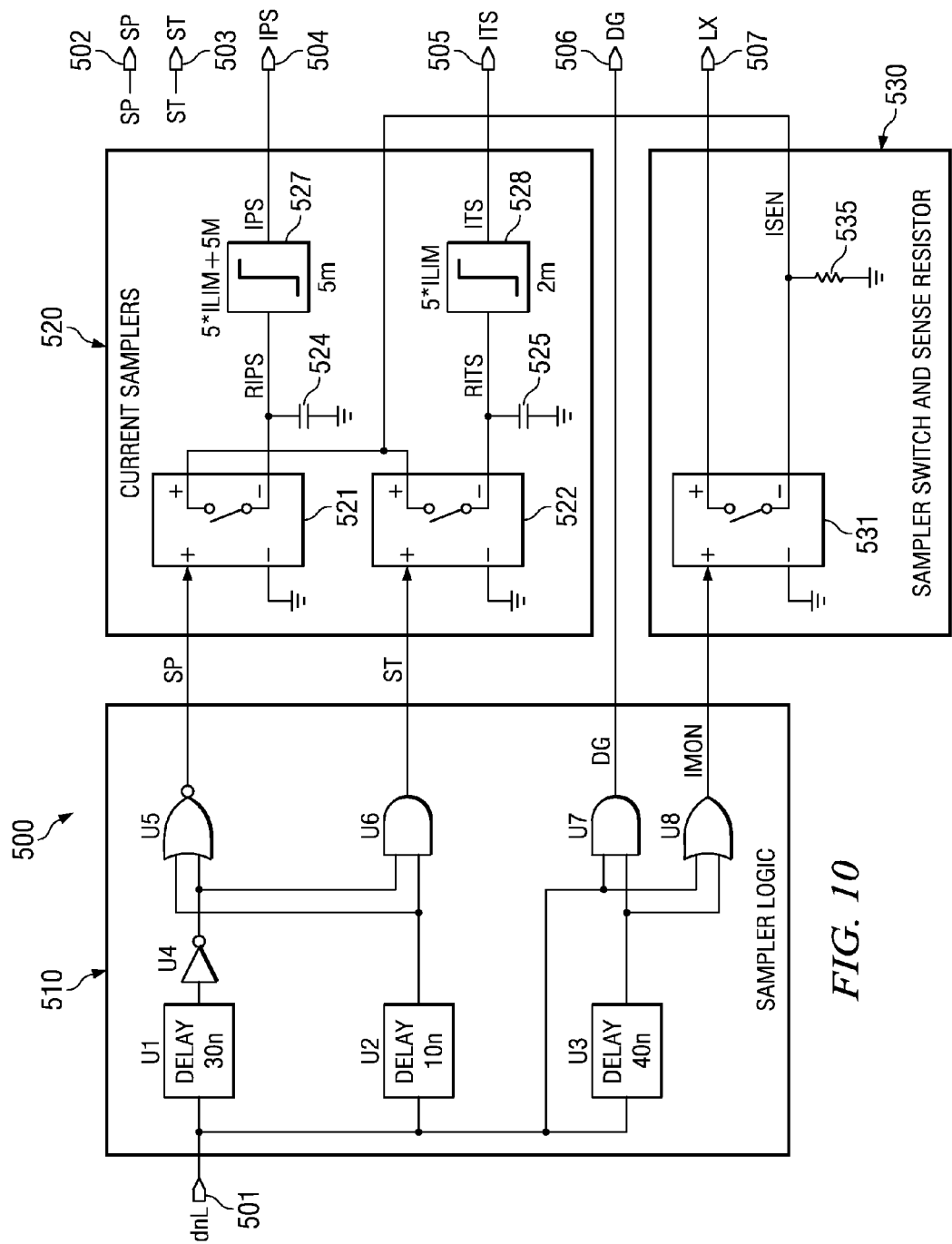
FIG. 10 is a PSPICE Analog Hardware Description Language circuit model for a dual channel sample and hold circuit, or current sampler used in a ripple current mode controller.
Figure 17:
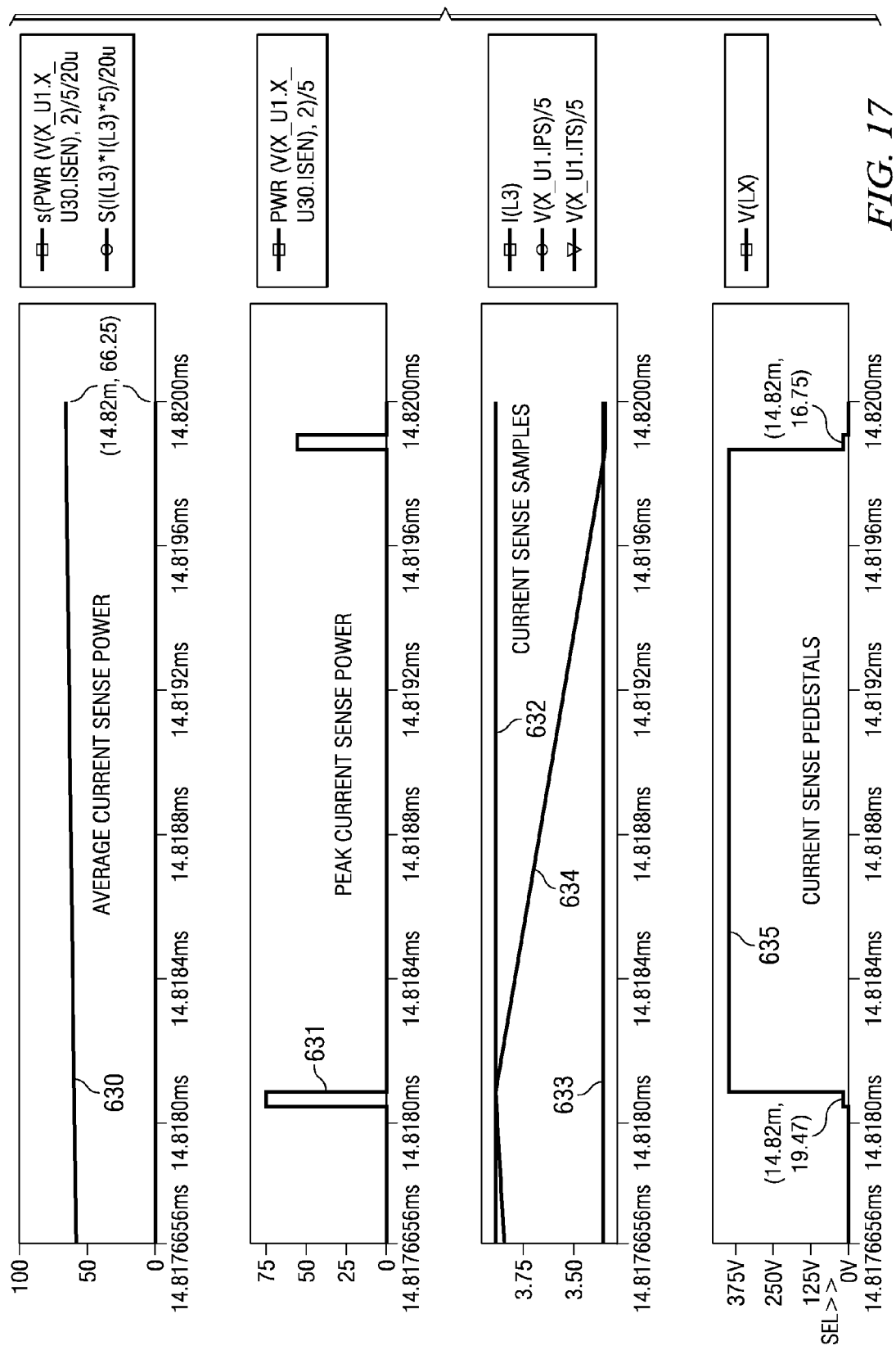
FIG. 17 depicts PSPICE simulation results showing time dependent current sample waveforms.
Figure 18:
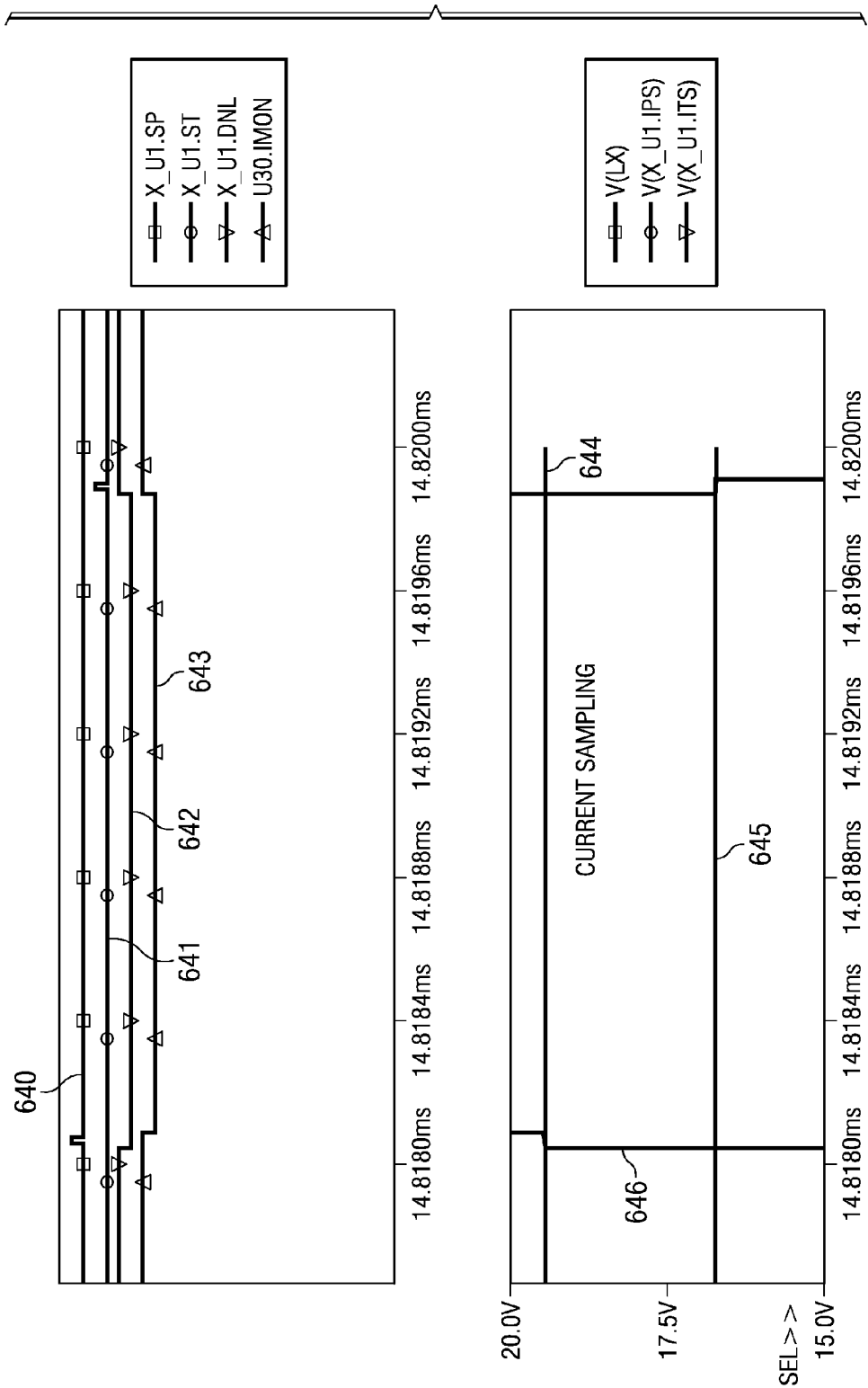
FIG. 18 depicts PSPICE simulation results showing time dependent digital current sample logic waveforms, and sample and hold waveforms.

Referring to FIG. 10, the charge current sampler schematic 500 is comprised of pin interconnects 501, 502, 503, 504, 505, 506, and 507. The associated simulation waveforms 630, 631, 632, 633, 634 and 635 are shown in FIG. 17, and associated simulation waveforms 640, 641, 642, 643, 624, 645, and 646 are shown in FIG. 18. The interconnects signal names are dnL, sp, st, ips, its, Dg, and Lx, and correspond to the signal names of the pins for the element 412 depicted in FIG. 8, and are electrically connected. One embodiment of the charge current sampler is depicted in pulse width modulator schematic 500 of FIG. 10. The Charge Current Sampler includes a means to sample and store magnetic charge duration values.

The charge pulse signal dnL at pin interface 501 provides an input signal for the sampler logic 510. The sampler logic 510 is a digital logic circuit that generates logic signals sp and st for controlling the current samplers 520, and logic signal Dg to control the magnetic storage element charge switch 401 through expression 403. The sampler logic 510 also provides logic signal imon, which is used to activate sample sense switch 531 to direct the charge current through sensing element 535.

On the rising edge of dnL, imon goes high which turns on sampler sense switch 531. When sampler sense switch 531 turns on, the magnetic charge current is directed from the Lx node to the current sense element 535. The magnetic charge current directed through the sense element 535 generates a voltage signal isen, which is sampled by the current samplers 520.

The charge current sampler has an average power dissipation of 0.01482 Watts (waveform 630), and a peak power dissipation of 75 Watts (waveform 631). By using a short sample duration a high gain high power sample pulse of 75 Watts can be obtained with a corresponding low average power dissipation of 0.01482 Watts.

Waveform 634 is the inductor current, and waveforms 632 and 633 show the sample values scales by a factor or 1/5. The Lx signal (waveform 635) transitions to an intermediate voltage level during the sample pulse because the sampling element has a much greater current sense impedance than the impedance of the charge current switch.

Referring to one embodiment of the charge current sampler 500, after a delay of 10 nano-seconds from the rising edge of dnL (waveform 642), st (waveform 641) goes high which turns on switch 522 to charge the trough charge sample capacitor 525 to the value of magnetic charge current sense signal isen. After a delay of 30 nano-seconds from the rising edge of dnL, st goes low to end the sampling period by turning off switch 522 at which time the value of signal rits is equal to the value of current sense signal isen.

After a delay of 40 nano-seconds from the rising edge of dnL Dg goes high which turns on the magnetic storage element charge switch 401 through expression 403. The sampler sense switch 531 remains on, and the magnetic storage element charge switch 401 and the series combination of the sampler sense switch 531 and the current sense element 535 are parallel connected. The majority of the magnetic element charge current passes through the magnetic storage element charge switch 401 because it provides a lower impedance path to ground.

On the falling edge of dnL (waveform 642), Dg goes low which turns off the magnetic storage element charge switch 401 through expression 403. When the magnetic element charge switch 401 is off the magnetic element charge current path to ground is through the series combination of the sampler sense switch 531 and the current sense element 535. The result is that the a valid current sense signal isen is established and available for current sampler 520.

After a delay of 10 nano-seconds from the falling edge of dnL, sp (waveform 640) goes high which turns on switch 521 to charge the peak charge sample capacitor 524 to the value of magnetic charge current sense signal isen. After a delay of 30 nano-seconds from the falling edge of dnL, sp goes low to end the sampling period by turning off switch 520 at which time the value of signal rips is equal to the value of current sense signal isen.

After a delay of 40 nano-seconds from the falling edge of dnL, imon (waveform 643) goes low which turns off the sampler sense switch 531 and the magnetic element charge current cycle ends.

The embodiments, terms, expressions, and methods, described herein are for the purposes of describing one embodiment of the invention, and do not exclude equivalents or impose limitations on the scope of the invention claims. One skilled in the art may conceive of variations, modifications, alternative embodiments, substitute elements, and variations in the methods described that fall within the scope of the invention claims. The utility of the invention is thus not limited.

What is claimed is:

1. A method of power conversion which achieves high power factor correction using ripple current mode control comprising:

rectifying an AC input voltage;

storing energy in a magnetic storage element;

directing current from said magnetic storage element to a charge storage element by using a transfer element to transfer energy to said charge storage element for an energy transfer duration;

transferring energy to an output load element;

directing said magnetic storage element current to a sampling means to sample and store said magnetic storage element current levels;

processing said magnetic storage element storage duration relative to said magnetic storage element storage duration plus the said energy transfer duration for charging said charge storage element based on said magnetic storage element sampled current levels and an energy demand signal to approximate a resistive load characteristic at the AC input voltage achieving high power factor correction;

adjusting energy conversion levels based on the said energy demand signal;

limiting the change in consecutive said magnetic and charge storage durations to achieve stability over the full range of operation;

averaging consecutive said magnetic charge storage durations to reduce noise susceptibility;

controlling a switching member to store energy in said magnetic storage element; and controlling a switching member to transfer energy to said charge storage element.

2. The method according to claim 1 wherein said control element includes at least one of a ripple current function and an average current function.

3. The method according to claim 1 wherein said control element includes at least one of a ratio function of ripple current to average current.

4. The method according to claim 1 wherein said control element includes a means to vary energy conversion levels in response to said energy demand signal including at least one of a multiplication function.

5. The method according to claim 1 wherein said control element includes a storage means to save prior magnetic charge duration values.

6. The method according to claim 5 wherein said control element includes a means to retrieve and utilize stored prior magnetic charge duration values to limit the variation of contiguous values of the magnetic charge durations.

7. The method according to claim 5 wherein said control element includes a means to retrieve and utilize stored magnetic charge duration values to include at least one smoothing function to reduce noise in the magnetic charge duration values.

8. The method according to claim 7 wherein said smoothing function includes a means to retrieve and utilize stored prior magnetic charge duration values to reduce magnetic charge duration variations.

9. The method according to claim 7 wherein said smoothing means includes at least one of a weighted averaging function.

10. The method according to claim 7 wherein said sampling means provides a peak and trough magnetic storage element current samples.

11. The method according to claim 2 wherein said ripple current function is derived from the difference between said peak and said trough current samples.

12. The method according to claim 2 wherein said average current function is derived from the average of said peak and said trough current samples.

13. A ripple current mode power converter comprising:
a rectified AC line input;
a magnetic storage element coupled to the rectified AC line input;
a transfer element coupled to the magnetic storage element;
a charge storage element coupled to the transfer element;
a demand input element to control energy transfer levels;
a connecting element to transfer energy to an output load;
a feedback circuit for comparing a reference signal to a DC component of the charge storage element in order to set a demand signal used to vary energy conversion levels of the ripple current mode power converter;
a switch element for charging the charge storage element; and
a ripple current mode controller element for using the demand signal and periodically calculating the magnetic storage element charge duration to control a state of the switch element in order to maintain an AC input current proportional to an AC input voltage,
wherein the controller processes a magnetic storage ripple current calculation to achieve high power factor forgoing the need to sense AC signal current and voltage levels.

14. The ripple current mode power converter as claimed in claim 13, wherein the switch is gated, said converter further comprising:
a current sampling element coupled to the controller;
a switch control element coupled to the controller for creating a stepped gate current sensing switch signal;
a duty cycle limiting element; and
a duty cycle averaging means for reduced noise.

15. The ripple current mode power converter as claimed in claim 13 wherein said controller element maintains the magnetic storage element operable in continuous current mode.

16. The ripple current mode power converter as claimed in claim 13 wherein said duty cycle limiting element is adapted to operate at duty cycles greater than 50%.

17. The ripple current mode power converter as claimed in claim 13 wherein said controller element periodically calculates said magnetic storage element charge durations and is adapted to provide AC-DC power factor corrected conversion utility.

18. The ripple current mode power converter as claimed in claim 13 wherein said controller element periodically calculates said magnetic storage element charge duration in proportion to said magnetic storage element ripple current to average current ratio.

19. The ripple current mode power converter as claimed in claim 13 wherein said controller element periodically calculates said magnetic storage element charge durations.

20. The ripple current mode power converter as claimed in claim 14 wherein said controller element provides the stepped gate current sensing switch drive signal such that the charge current sample can be sensed by a partially turned on switch, and the magnetic storage element current is sensed during the interval when the switch is partially turned on providing a high impedance magnetic storage element current sense element derived from the partially turned on switch.

21. A switch mode power supply comprising the ripple current mode power converter of claim 13 wherein:
the power converter includes an inductor to store magnetic energy and a capacitor to store charge energy; and
the power supply is adapted to operate as a controllable active rectifier supply, or a boost mode power supply.

22. The ripple current mode power converter as claimed in claim 21 wherein said controller element periodically calculates said magnetic storage element charge duration to control the state of said switch element to maintain the AC input current proportional to the AC input voltage.

23. The switch mode power supply as claimed in claim 21 wherein said charge storage element voltage is compared to a desired value to adjust the energy demand signal to maintain an output voltage in the presence of line and load variations.

* * * * *